United States Patent [19]
Romick et al.

[11] Patent Number: 6,098,732
[45] Date of Patent: *Aug. 8, 2000

[54] APPARATUS FOR PROVIDING SELF-PROPELLED MOTION TO MEDICATION CARTS

[75] Inventors: Jerome A. Romick; Timothy A. Friar, both of Columbus; Kevin A. Kelly, Galloway, all of Ohio; Nathaniel A. Jarvis, Sunnyvale, Calif.

[73] Assignee: Medicart, L.L.C., Columbus, Ohio

[*] Notice: This patent is subject to a terminal disclaimer.

[21] Appl. No.: 09/386,790

[22] Filed: Aug. 31, 1999

Related U.S. Application Data

[63] Continuation of application No. 08/844,376, Apr. 18, 1997, Pat. No. 6,000,486.

[51] Int. Cl.$^7$ .................................................. B62D 61/12
[52] U.S. Cl. ............................................. 180/23; 180/209
[58] Field of Search ................................ 180/11, 12, 13, 180/19.1, 19.2, 22, 23, 24, 209, 252

[56] References Cited

U.S. PATENT DOCUMENTS

| | | | |
|---|---|---|---|
| Re. 34,171 | 2/1993 | Romick et al. ...................... | 312/257.1 |
| 2,749,996 | 6/1956 | Parker et al. ........................... | 180/19 |
| 2,906,357 | 9/1959 | Pletka ................................... | 180/15 |
| 2,978,053 | 4/1961 | Schmidt ................................ | 180/26 |
| 3,263,765 | 8/1966 | Just et al. .............................. | 180/23 |
| 3,380,546 | 4/1968 | Rabjohn ............................... | 180/15 |
| 3,398,809 | 8/1968 | Wood et al. ......................... | 180/119 |
| 3,482,894 | 12/1969 | Pryor ................................... | 312/250 |
| 3,735,224 | 5/1973 | Bachofer et al. ................... | 318/284 |
| 3,779,328 | 12/1973 | Wollenburg ........................ | 180/14 A |
| 3,924,169 | 12/1975 | Craft et al. .......................... | 318/354 |
| 3,938,608 | 2/1976 | Folco-Zambelli .................. | 180/21 |
| 3,942,449 | 3/1976 | Nelson ................................ | 180/24 |
| 4,077,535 | 3/1978 | Oriol ................................... | 214/515 |
| 4,221,273 | 9/1980 | Finden ................................ | 180/6.48 |
| 4,638,879 | 1/1987 | Collonia .............................. | 180/179 |
| 4,694,923 | 9/1987 | Grenzicki ............................ | 180/6.5 |
| 4,866,356 | 9/1989 | Altendorf ............................ | 388/811 |
| 4,971,170 | 11/1990 | Rasmussen ......................... | 180/22 |
| 4,985,666 | 1/1991 | Nakabayashi ...................... | 318/434 |
| 5,010,283 | 4/1991 | Katajima et al. ................... | 318/373 |
| 5,065,320 | 11/1991 | Hayashi et al. .................... | 364/424.01 |
| 5,139,321 | 8/1992 | Beardsley ........................... | 312/209 |
| 5,183,133 | 2/1993 | Roy et al. ........................... | 180/252 |
| 5,281,020 | 1/1994 | Romick ............................... | 312/308 |
| 5,281,900 | 1/1994 | Park .................................... | 318/139 |
| 5,282,678 | 2/1994 | Teufel et al. ....................... | 312/221 |
| 5,301,765 | 4/1994 | Swanson ............................. | 180/68.5 |
| 5,303,156 | 4/1994 | Matsuoka et al. ................. | 364/424.05 |
| 5,331,258 | 7/1994 | Lankin et al. ...................... | 318/139 |
| 5,373,910 | 12/1994 | Nixon ................................. | 180/65.1 |
| 5,445,233 | 8/1995 | Fernie et al. ....................... | 180/6.5 |
| 5,530,788 | 6/1996 | Saijima .............................. | 388/811 |
| 5,549,175 | 8/1996 | Torii et al. ......................... | 180/209 |

*Primary Examiner*—Kevin Hurley
*Attorney, Agent, or Firm*—Wood, Herron & Evans, L.L.P

[57] ABSTRACT

Apparatus for providing self-propelled motion to a medication cart comprises a driving unit which is mounted to a base of the medication cart. The driving unit includes a drive wheel which is movable between extended and retracted positions. In the extended position, the drive wheel engages the floor to provide self-propelled motion to the medication cart. In the retracted position, the medication cart is freely movable on supporting castor wheels. Foot operated pedals are provided to move the drive wheel between the extended and retracted positions. Forward and reverse motion of the cart is provided by a rocker switch which is positioned on a top panel of the cart.

19 Claims, 6 Drawing Sheets

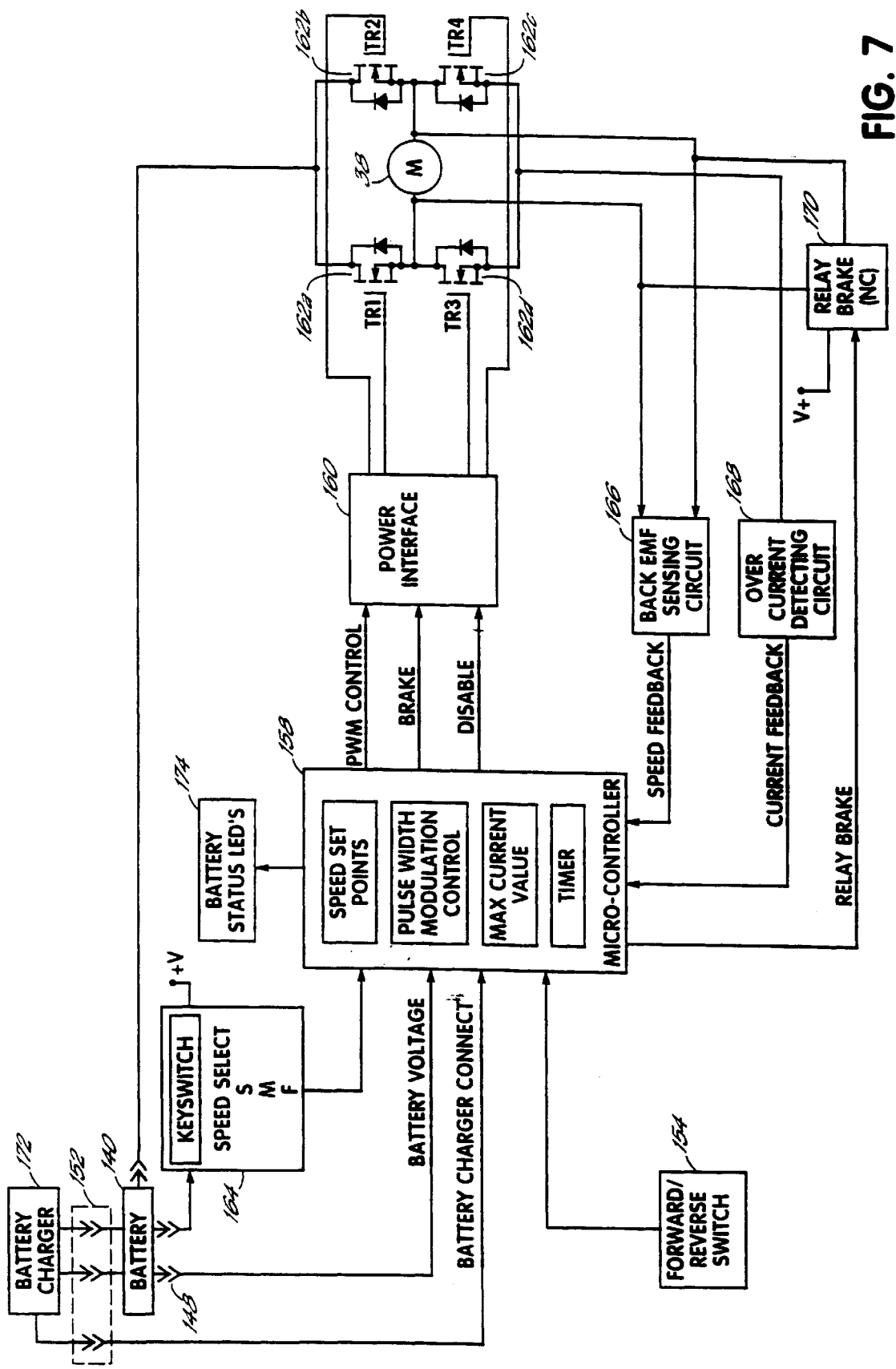

6,098,732

APPARATUS FOR PROVIDING SELF-PROPELLED MOTION TO MEDICATION CARTS

The present application is a continuation of U.S. Ser. No. 08/844,376, filed on Apr. 18, 1997, U.S. Pat. No. 6,000,486 the disclosure of which is hereby incorporated herein by reference in its entirety.

FIELD OF THE INVENTION

The present invention relates generally to medication carts for delivery of medication to patients in a care facility and, more particularly, to driving units for providing self-propelled motion to such medication carts.

BACKGROUND OF THE INVENTION

Medication carts are frequently used in hospitals, nursing homes and other long-term care facilities for delivery of medication on a continuing basis to patients within the facility. Typically, medication carts are stocked at a pharmacy where individual doses of medication for each patient are metered and stored in separate trays or bins which are carried by the cart. Medication carts are supported on castors and are pushed by nurses from one patient's room to another where each patient's tray or bin is accessed for delivery of medication.

It will be appreciated that in large hospital and nursing care facilities, for example, the pharmacy and patient rooms may be located in different wings which may require a nurse to move the medication cart over long distances with intervening steep inclines and declines in the path of the cart. To alleviate the physical strain associated with moving heavy medication carts through a care facility, U.S. Pat. No. 4,077,535 discloses a motorized drive unit which is adapted to support the underside of a medication cart for automated movement of the cart through the facility. Direction of the medication cart is controlled by a central console which uses a network of buried cables which operate with the driving unit to define pre-determined routes for the cart to follow.

While the motorized drive unit of U.S. Pat. No. 4,077,535 provides self-propelled motion to medication carts, it has several disadvantages. The disclosed driving unit must be positioned in proper registration with the underside of the cart before it can be raised to lift the cart off of its supporting castors. The driving unit includes multiple magnetic sensors and lifting platforms to achieve the lifting function which increases the cost and complexity of the driving unit and operation of the medication cart. Due to the required lifting operation of the driving unit to mate with the medication cart, the cart is not readily adaptable to switch between manual and self-propelled modes of operation. Moreover, the medication cart must follow pre-determined routes of travel throughout the facility and is not therefore freely movable by a nurse in a variety of different directions as may be required.

Accordingly, there is a need for a driving unit to provide self-propelled motion to a medication cart which reduces physical strain associated with movement of the cart throughout a hospital, nursing home or other long term care facility. There is also a need for a self-propelled medication cart which is readily adaptable to switch between manual and self-propelled modes of operation. There is yet another need for a self-propelled medication cart which is freely movable in a variety of directions.

SUMMARY OF THE INVENTION

To these ends, the present invention is directed to a driving unit for providing self-propelled motion to a medication cart. The driving unit preferably includes forward and rearward support assemblies which are mounted to a base of the medication cart. The forward support assembly carries a pair of castor wheels and a drive wheel which is movable between extended and retracted positions. In the extended position, the drive wheel engages the floor to provide self-propelled motion to the medication cart in both forward and reverse directions. The location of the drive wheel provides a near-zero turning radius to permit self-propelled movement of the medication cart in a variety of directions.

The rearward support assembly carries a pair of castor wheels and a pair of foot operated pedals for selectively moving the drive wheel between the extended and retracted positions. In one position of the foot pedals, the drive wheel is extended, while in another position of the pedals, the drive wheel is retracted. When the drive wheel is in the retracted position, the medication cart is freely movable on the castor wheels for manual movement by a nurse.

Forward and reverse movement of the drive wheel, and thus the medication cart, is achieved by manual operation of a rocker switch which is preferably located on a top panel of the medication cart. The rocker switch is positioned to be easily manipulated by one hand of the nurse as she walks behind or on the side of medication cart maintaining steering control. The drive wheel is attached to the shaft of a reversible motor which is energize d by a storage battery housed within the medication cat rt.

The driving unit of the present invention thus provides self-propelled motion to the medication cart when the drive wheel is extended to reduce physical strain associated with movement of the cart. Movement of the drive wheel between the extended and retracted positions by operation of the foot pedals provides a quick and easy switch of the medication cart between manual and self-propelled modes of operation. Moreover, the drive and castor wheels permit self-propelled movement of the medication cart in a variety of directions.

The above features and advantages of the present invention will become more readily apparent with reference to the accompanying figures and detailed description.

BRIEF DESCRIPTION OF THE DRAWINGS

Reference will now be made to the accompanying figures from which the novel features and advantages of the present invention will be apparent:

FIG. 7 is a functional block diagram showing electrical features of the medication cart.

DETAILED DESCRIPTION OF THE INVENTION

Figure 1:
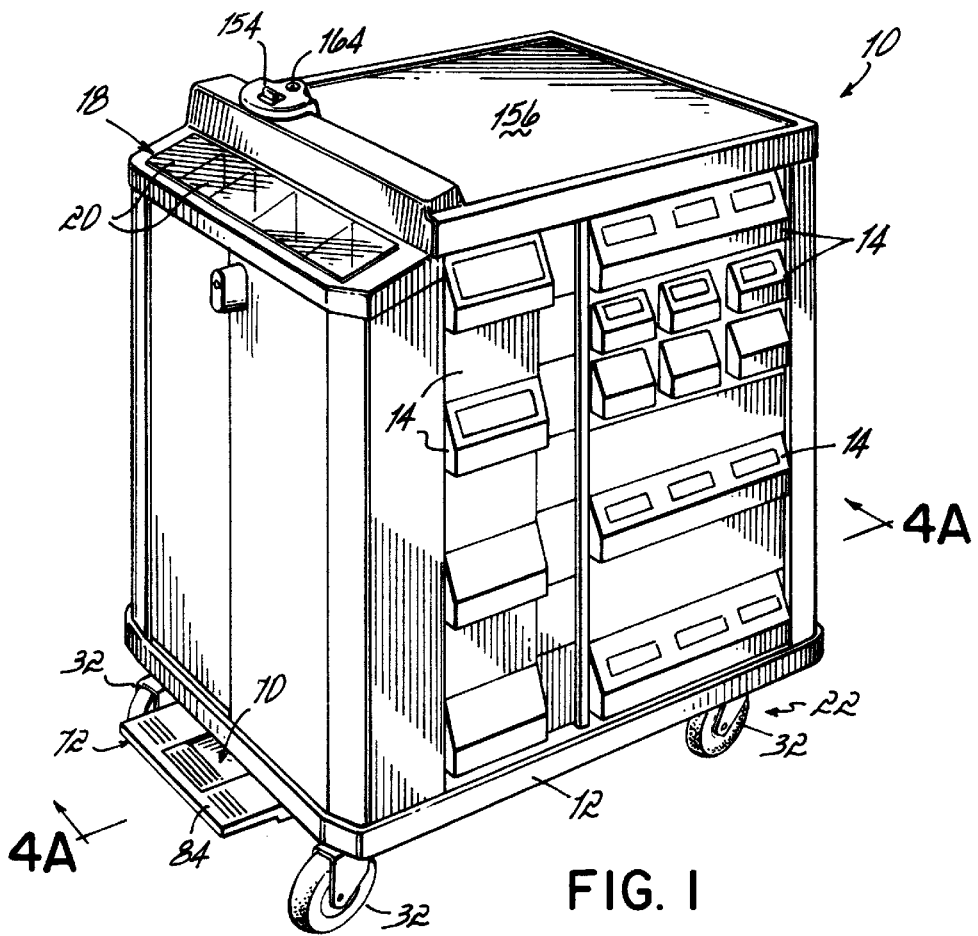
FIG. 1 is a perspective view of a self-propelled medication cart in accordance with the principles of the present invention.
Figure 2:
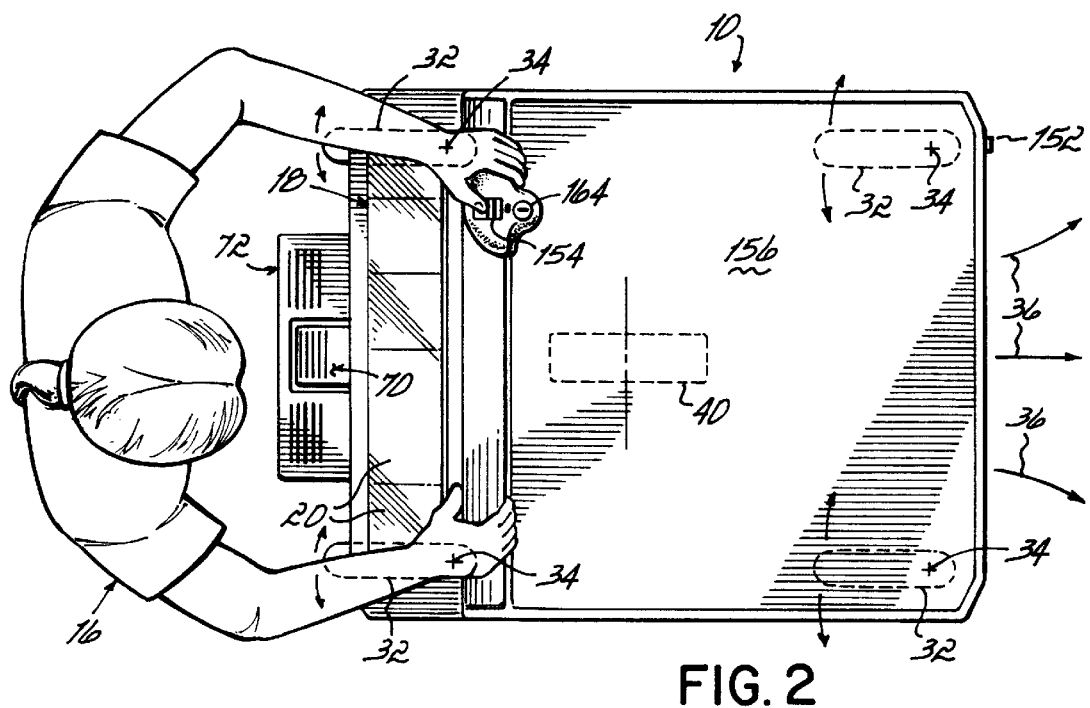
FIG. 2 is a top view of the medication cart shown in FIG. 1 being operated by an attendant.

With reference to the figures, and to FIG. 1 in particular, a self-propelled medication cart 10 is shown in accordance with the principles of the present invention. Medication cart 10 includes a base 12 which supports a series of vertically stacked trays, bins and shelves 14 which are configured to store individual doses of patient medication to be delivered by an attendant 16 (FIG. 2). Medication cart 10 also includes a cabinet 18 on a rearward end of the cart which has rectangular holes 20 for receiving different types of instrumentalities, such as, for example, a bio hazard waste insert (for hypodermic needles), a general waste insert, a drinking cup dispenser, and an electronic insert which contains a keyboard for the electronic control operation of control locks and a security alarm system (not shown). Preferably, medication cart 10 is supplied by Artromick International, Inc., of Columbus, Ohio, assignee of the present invention, which does not form any part of the present invention per se. The details of the construction and operation of medication cart 10 may be found in U.S. Pat. Nos. RE 34,171 and 5,282,678, both of which are expressly incorporated herein by reference in their entirety. In accordance with the present invention, a driving unit 22 (FIG. 3) is mounted to base 12 for providing self-propelled motion to the medication cart 10 as will be described in more detail below.

Figure 3:
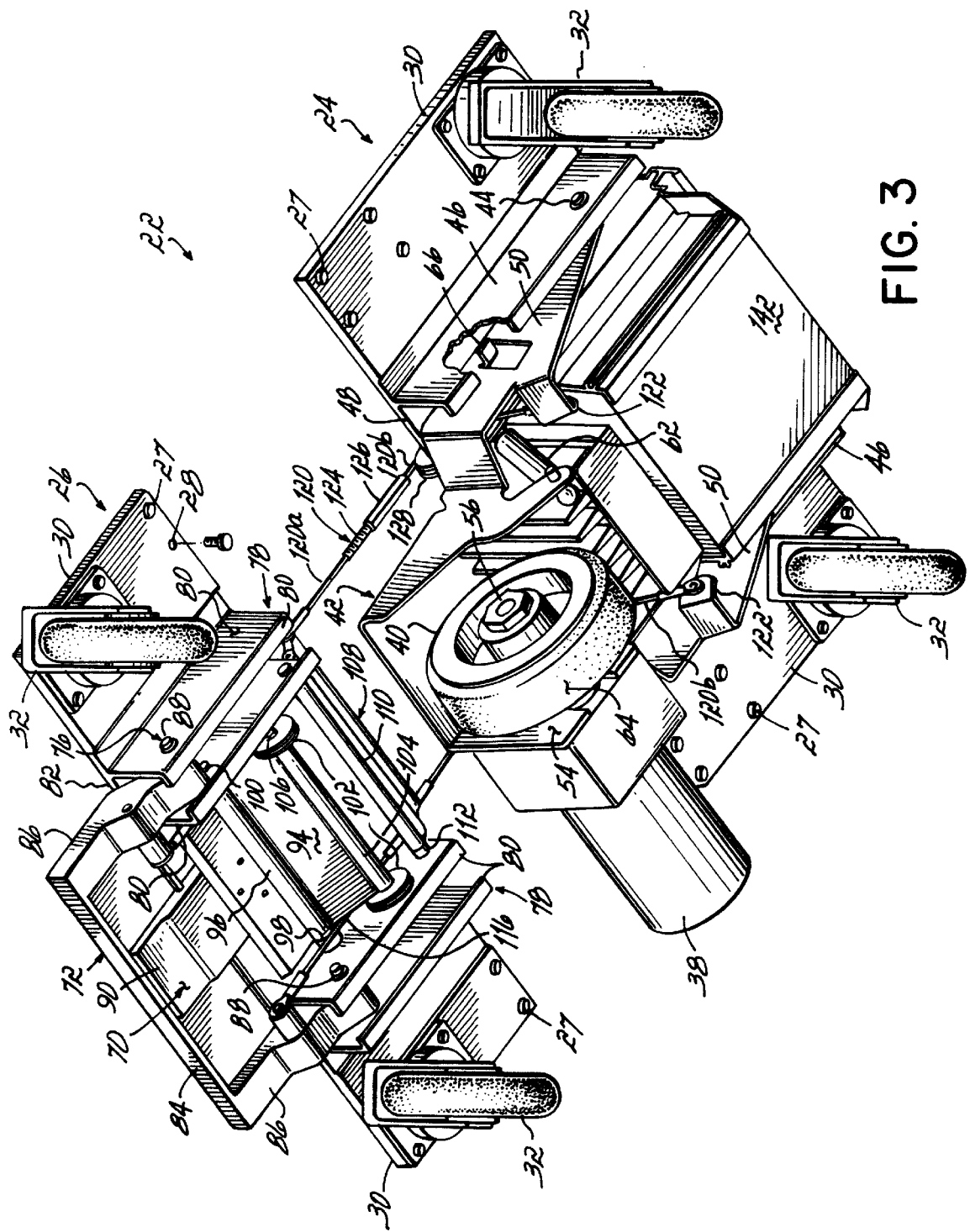
FIG. 3 is a bottom perspective view of a driving unit in accordance with the present invention for providing self-propelled motion to the medication cart shown in FIG. 1 through an extendable and retractable drive w heel.

Referring now to FIGS. 1–3, the driving unit 22 (FIG. 3) preferably includes forward and rearward support assemblies 24 and 26, respectively, which are adapted to mount to base 12 through suitable fasteners 27. The fasteners 27 extend into the base 12 through bores 28 which are formed in outwardly directed support flanges 30 of the forward and rearward support assemblies 24 and 26. As used herein, it will be appreciated that the term "forward" refers to the front or leading end of the medication cart 10, while the term "rearward" refers to the trailing end of the cart nearest to the attendant 16 (FIG. 2). Each of outwardly directed support flanges 30 preferably carries a heavy duty castor wheel 32 for providing rolling support to the medication cart 10 on a variety of surfaces. As shown most clearly in FIG. 2, the castor wheels 32 preferably turn freely about vertical axes 34 to permit steering of the medication cart 10 by the attendant 16 in virtually any direction, as indicated by arrows 36.

As explained in greater detail in U.S. Pat. No. 5,282,678 which has been incorporated herein by reference, the size of the medication cart 10 may be readily varied to provide different configurations of trays, bins and shelves 14 as may be required by a particular care facility. To this end, the length of base 12 is preferably extendable from 26" to 46", for example, to provide a smaller or larger medication cart 10 as may be required. As will be described in more detail below, the forward and rearward support assemblies 24 and 26 are adapted to accommodate for different lengths in the medication cart 10 by increasing or decreasing the spacing between the respective assemblies. In this way, the driving unit 22 is essentially universal in construction to be readily installed on a variety of medication carts 10 having different longitudinal lengths.

Figure 4A:
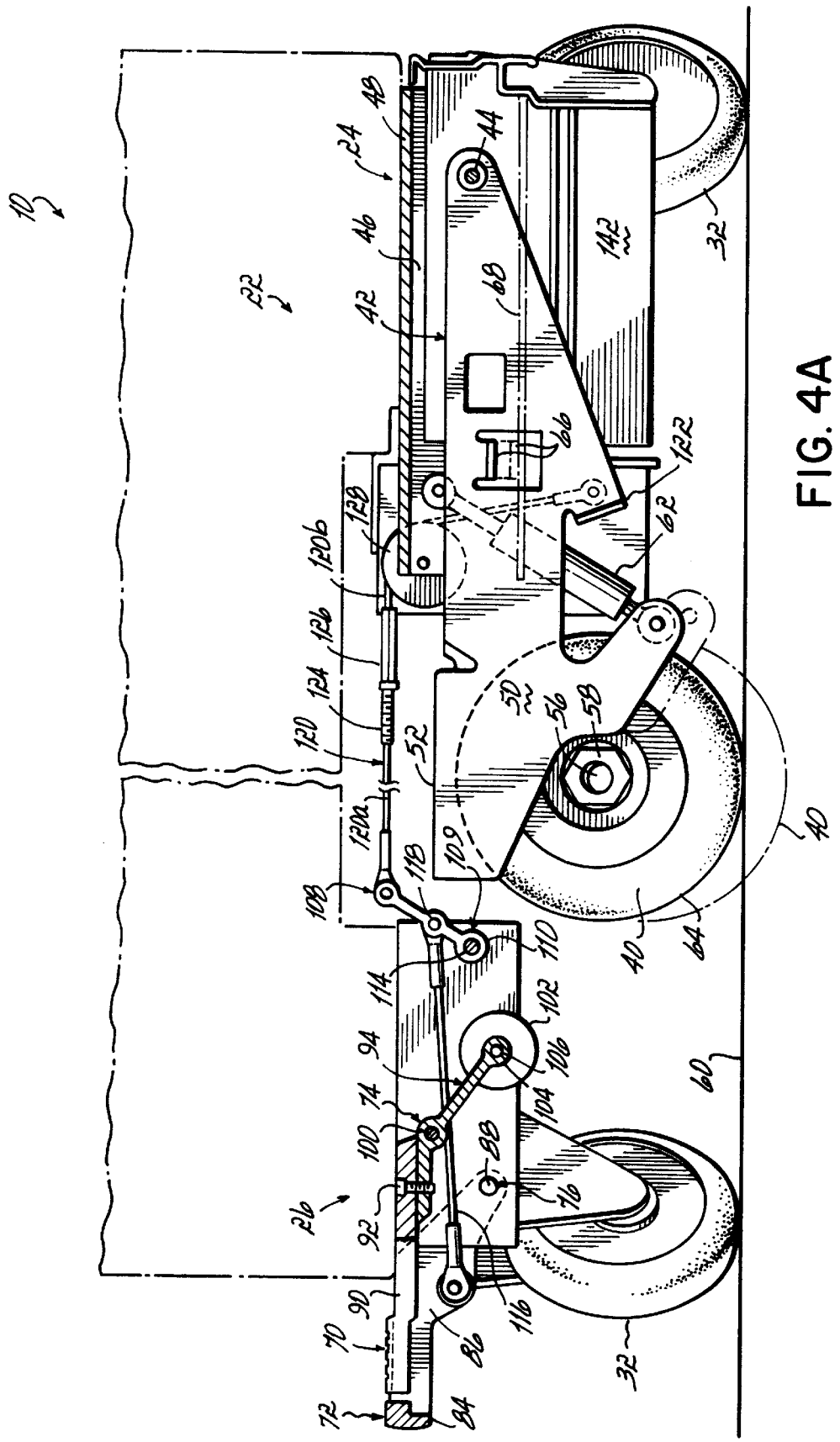
FIG. 4A is a cross-sectional view taken generally along line 4A—4A of FIG. 1 showing the driving unit mounted to the bottom of the medication cart with the drive wheel in an extended position.
Figure 4B:
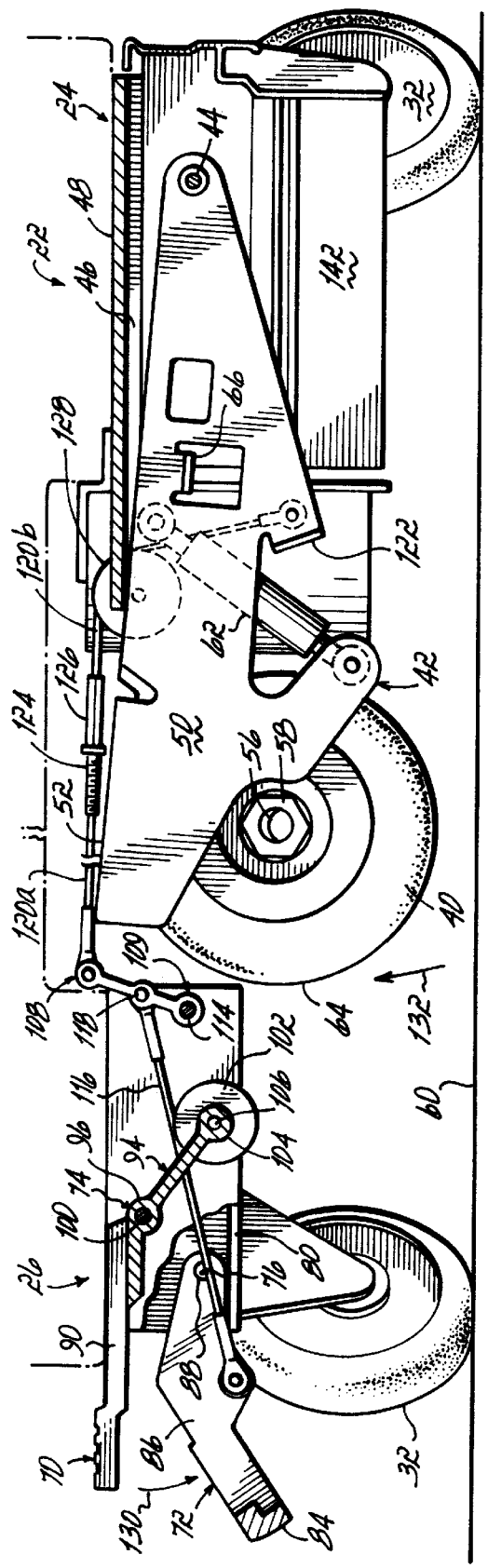
FIG. 4B is a view similar to FIG. 4A showing movement of the drive wheel from the extended position to a retracted position.
Figure 4C:
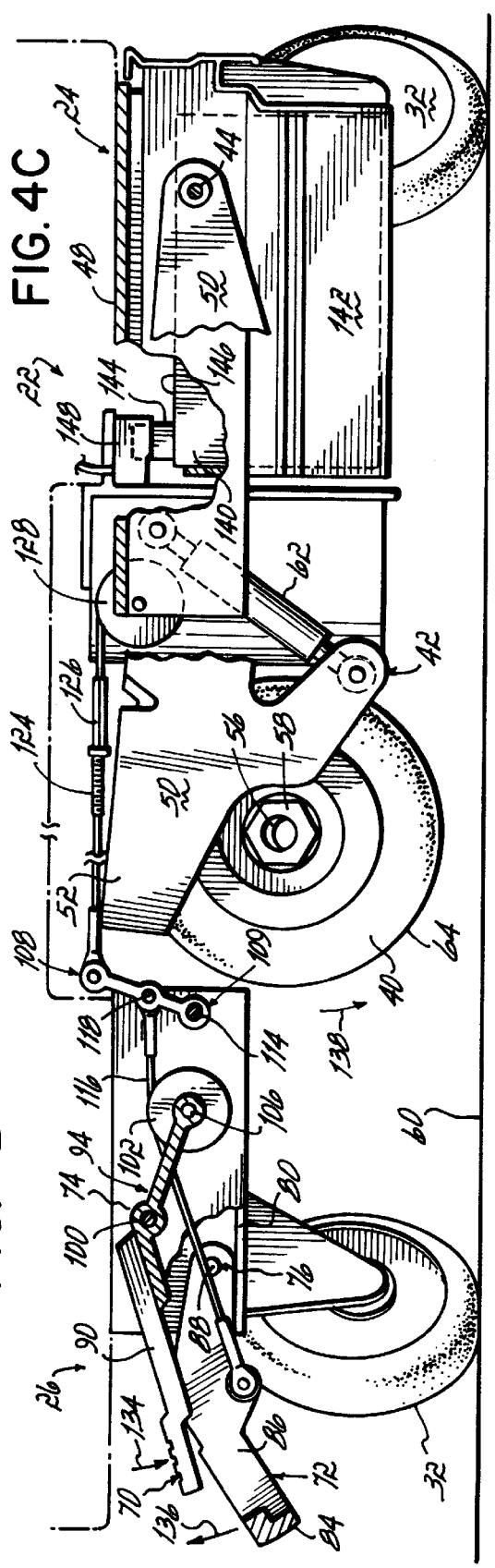
FIG. 4C is a view similar to FIGS. 4A and 4B showing movement of the drive wheel from the retracted position to the extended position.

As shown most clearly in FIGS. 3–4C, the driving unit 22 includes a reversible motor 38 which is attache d to a drive wheel 40 for providing self-propelled motion to medication cart 10 in accordance with the present invention. More particularly, a U-shaped pivot member 42 is connected through opposite pivot connections 44 (one shown) to a pair of vertically oriented support flanges 46 (one shown) which depend from a top plate 48 (FIG. 3) of the forward support assembly 24. Pivot member 42 includes a pair of opposite side flanges 50 which extend from the pivot connections 44 to an integral rearward end 52 of the pivot member 42. The rearward end 52 of the pivot member 42 includes a vertically oriented planar flange 54 (FIG. 3) which is adapted to support the reversible motor 38 through suitable fasteners (not shown). Planar flange 50 is an integral part of side flange 50 with an offset to accommodate for the motor 38. The drive wheel 40 is preferably mounted to a shaft 56 of the motor 38 through a single bolt-tightened bushing 58 to lock the drive wheel to the motor shaft. As will be described in more detail below, the drive wheel is adapted to move between an extended position (FIG. 4A) wherein it engages a surface 60 (such as a carpet or linoleum floor, for example) to provide self-propelled motion to the medication cart 10, and a retracted position (FIG. 4B) wherein it is disengaged from the surface 60 to provide for manual operation of the cart through castor wheels 32.

To provide pivotal movement of the drive wheel 40, one of the side flanges 50 of the pivot member 42 is connected to the forward support assembly 24 through a gas spring 62 which biases the drive wheel 40 toward the extended position and balances the load of the reversible motor 38 across the pivot member 42. While one gas spring 62 is shown, it will be appreciated that more than one gas spring may be used. The drive wheel 40 preferably has a non-marring tread 64 to provide traction on a variety of surfaces 60 which may be encountered in a hospital, nursing home or other long-term health care facility. As the medication cart 10 may be required to transition from one type of surface 60 to another (e.g., from carpet to linoleum) or to pass over a threshold, the drive wheel 40 is adapted to extend above and below a plane defined by the lowermost points of the castor wheels 32 (see the position shown in phantom in FIG. 4A) to provide substantially constant engagement of the drive wheel 40 with the surface 60. To this end, pivot member 42 which carries drive wheel 40 is constantly biased by the gas spring 62 to pivot downwardly about pivot connections 44. A pair of outwardly directed tabs 66 on respective side flanges 50 of the pivot member 42 strike respective inwardly directed flanges 68 on the pair of depending support flanges 46 and interference between members 42 and 48 on the top-most surface of the side flange 50 act to provide an absolute stop for the downward and upward motions of the drive wheel, respectively. (FIGS. 3 and 4A).

As shown most clearly in FIGS. 3 and 4A–4C, movement of the drive wheel 40 between the extended and retracted positions is preferably accomplished through a pair of foot operated, inner and outer pedals 70 and 72 which are pivotally connected to the rearward support assembly 26 through respective pivot connections 74 and 76. More particularly, the rearward support assembly 26 has two spaced pairs 78 of vertically oriented channel-shaped flanges 80 which depend from a top plate 82 (FIG. 3) of the rearward support assembly 26. Outer pedal 72 is preferably a generally U-shaped member 84 (FIGS. 1–3) which includes a pair of integral pedal links 86 at its opposite sides. Remote ends of the pedal links 86 are positioned between the channel-shaped flanges 80 of each spaced pair 78, and are connected to the pivot connections 76 through elongated pins 88 which extend through the pedal links 86.

Inner pedal 70 is preferably a plate member 90 (FIGS. 1–3) which is mounted through fasteners 92 (FIG. 4A) to a pedal link 94. Pedal link 94 is preferably positioned between the spaced pairs 78 of channel-shaped flanges 80, and is connected at its opposite sides to a respective channel-shaped flange 80 of each pair 78 through the pivot connections 74. Preferably, the pedal link 94 includes an enlarged tubular body portion 96 having a plastic sleeve 98 (FIG. 3) for receiving an elongated pin 100 which extends between the pivot connections 74. The pedal link 94 also includes a pair of pulleys 102 at a remote end of the pedal link for purposes to be described in more detail below. Preferably, the pedal link 94 includes an enlarged tubular body portion 104 at the remote end of the pedal link for receiving an elongated pin 106 which supports the pair of pulleys 102.

Further referring to FIGS. 3 and 4A–4C, a pivot link 108 is positioned between the spaced pair 78 of channel-shaped flanges 80, and is connected at its lower opposite end with respective pivot connections 109 located on opposite sides of the pivot link 108. Preferably, the pivot link 108 includes an enlarged tubular body portion 110 having a plastic sleeve 112 (FIG. 3) for receiving an elongated pin 114 which extend s between the pivot connections 109. A pair of cables 116 are provided connections 118 positioned approximately midway on opposite sides of the pivot link 108. Another pair of cable s 120 are provided which connect upper opposite sides of the pivot link 108 with respective ears 122 formed on the side flanges 50 of pivot member 42. More particularly, the pair of cables 120 comprise a first pair of cables 120a which extend from upper opposite sides of the pivot link 108 to respective threaded connectors 124 attached to remote ends o f the cables 120a. A second pair of cables 120b are connected to the first pair of cables 120a through adjustable turnbuckles 126 which are attached to remote ends of cables 120b. A pair of pulleys 128 is mounted to the forward support assembly 24 over which the cables 120b extend from the adjustable turnbuckles 126 to the respective ears 122 of pivot member 42. It will be appreciated that an increase or decrease in the spacing between the forward and rearward support assemblies 24 and 26, as may be required for installation of the driving unit 22 on different sizes of medication carts 10 as described above, is achieved by changing the length of one or more of the cables 120a and 120b. The threaded connectors 124 of cables 120a and the turnbuckles 126 of cables 120b provide for accurate adjustment in the lift and drop of the pivot member 42 and drive wheel 40. Additionally, the turnbuckles 126 maintain constant tension of the cables 116 and 120 even with upward and downward motion of the drive wheel 40, by virtue of a compression spring (not shown) fitted inside the turnbuckle between elements 126 and 120b.

Referring now to FIG. 4A, it will be appreciated that when the inner and outer pedals 70 and 72 are in the upward positions as shown in the figure, the pivot member 42 is biased downwardly by the gas spring 62 to allow the drive wheel 40 to assume the extended position wherein it engages the surface 60 to provide self-propelled motion to the medication cart 10. As shown in FIG. 4B, as the outer pedal 72 is pushed downwardly by foot operation in the direction represented by arrow 130, tension is created on the pair of cables 116 which extend between the pedal links 86 of the outer pedal and the pivot link 108, and on the pair of cables 120 which extend between the pivot link 108 and the ears 122 of the pivot member 42, to cause the pivot member 42 and drive wheel 40 to raise in the direction represented by arrow 132. In particular, as the outer pedal 72 is lowered, the pair of cables 116 forces the pivot link 108 to pivot counterclockwise about pivot connections 109 (one shown) to pull the ears 122 of the pivot member 42 upwardly through the pair of cables 120. Moreover, as the outer pedal 72 moves downwardly, the pair of cables 116 eventually move downwardly over the respective centers of the pivot connections 76 (one shown) to force the outer pedal to further move in the downward direction as represented by arrow 130. When the drive wheel 40 is in the retracted position as shown in FIG. 4B, the medication cart 10 is freely movable on the castor wheels 32 in virtually any direction by the attendant 16 (FIG. 2). As shown most clearly in FIG. 2, the drive wheel 40 is preferably positioned with its transverse axis located slightly rearwardly of the center of the medication cart 10. In this way, the medication cart 10 has a near-zero turning radius with the drive wheel 40 in the extended position. Moreover, the configuration of the pivot member 42 and the location of the gas spring 62 provide positive-positive traction when the medication cart 10 is operated in the forward direction.

As shown in FIG. 4C, the pivot member 42 and drive wheel 40 are moved from the ex tended position to the retracted position by downward movement of the inner pedal 70 by foot operation, as represented by arrow 134. More particularly, as inner pedal 70 moves downwardly, the pair of pulleys 102 at the remote end of the pedal link 94 move upwardly to engage the pair of cables 116. Eventually, the upward movement of the pulleys 102 forces the p air of cables 116 to move upwardly past the respective centers of the pivot connections 76 (one shown) to force the outer pedal 72 to move upwardly as represented by arrow 136. It will be appreciated that as t he outer pedal 72 moves upwardly, tension is released on the pair of cables 116 which extend between the pedal links 86 of the outer pedal and the pivot link 108, and on the pair of cables 120 which extend between the pivot link 108 and the ears 120 of the pivot member 42, to cause the pivot member 42 and drive wheel 40 to lower in the direction represented by arrow 138. In particular, as the outer pedal 72 is raised, the downward biasing force of the gas spring 62 on the pivot member 42 causes the pivot link 108 to pivot clockwise about pivot connections 109 (one shown), thereby allowing the ears 122 of the pivot member 42 to move downwardly through the released tension on the pair of cables 120. When the drive wheel 40 reaches the extended position as shown in FIG. 4A, the medication cart 10 is supported on the castor wheels 32, and is self-propelled by the drive wheel 40, in virtually any direction by the attendant 16 (FIG. 2).

Figure 5:
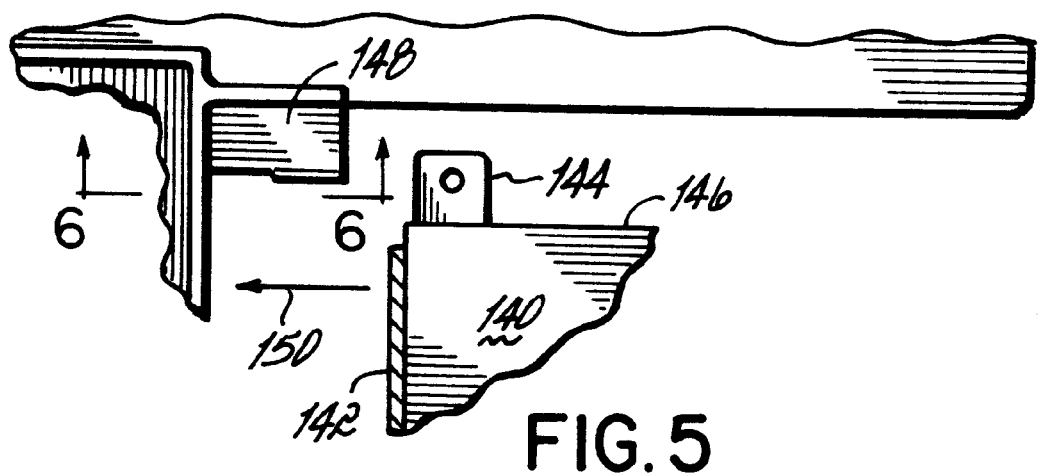
FIG. 5 is a side view, partially broken away, showing electrical connection of a storage battery with the medication cart of FIG. 1.
Figure 6:
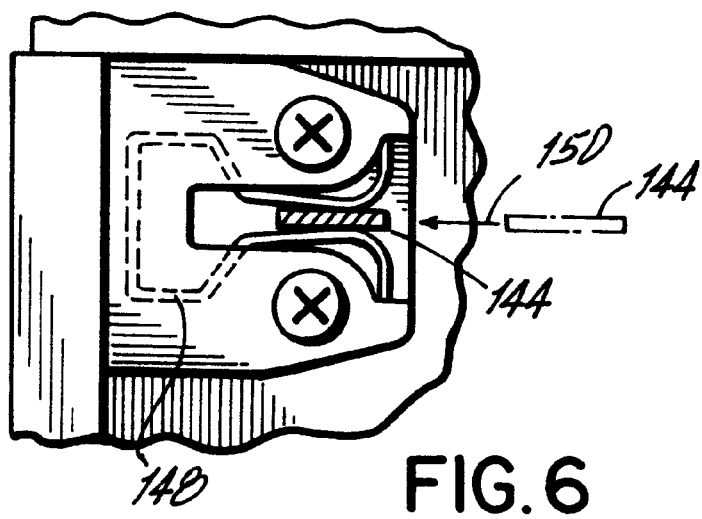
FIG. 6 is a cross-sectional view taken along line 6—6 of FIG. 5.

As shown most clearly in FIGS. 4C, 5 and 6, the reversible motor 38 is energized by a storage battery 140 which is mounted in an extensible drawer 142 carried by the forward support assembly 24. The storage battery 140 is preferably a 12V, 24 amp-hour battery which includes a pair of vertically oriented battery terminals 144 (one shown) extending from a top surface 146 of the battery. The forward support assembly 24 includes a pair of electrical spring connectors 148 (one shown) which are adapted to capture and electrically contact the respective terminals 144 of the storage battery 140 as the drawer 142 is closed in the direction of arrow 150 in FIGS. 5 and 6. The electrical spring connectors 148 thereby provide an automatic electrical connection with the terminals 144 of the storage battery 140 when the drawer 142 is fully closed. The storage battery 140 is generally able to operate for approximately four (4) hours before the battery needs to be replaced with a fresh battery or recharged. As will be described in more detail below, the medication cart 10 has a battery charger coupling 152 on the front of the cart (FIG. 2) for electrically coupling the storage battery 140 to an electrical outlet or other charging system through a charger cable (not shown).

As shown most clearly in FIGS. 1 and 2, operation of the reversible motor 38 to rotate the drive wheel 40 in forward and reverse directions is accomplished through a rocker switch 154 which is preferably positioned on a top panel 156 of the medication cart 10. As shown in FIG. 2, the rocker switch 154 is preferably positioned to be easily manipulated by one hand of the attendant 16 as she walks behind or on the side of the medication cart 10 maintaining steering control. Alternatively, it is contemplated in another embodiment of the present invention that the rocker switch 154 could be positioned on the top panel 156 of the medication cart 10 along its longitudinal axis to allow operation of the rocker switch by either hand of the attendant. The rocker switch 154 preferably has forward and reverse positions to initiate forward and reverse movements of the medication cart 10, respectively, and a center off position as will be described in more detail below.

Referring now to the block diagram of FIG. 7, the electrical features of the self-propelled medication cart 10 are shown in greater detail. The electronics of medication cart 10 are preferably contained on a single printed circuit board (not shown) which is self-cooled and completely enclosed within the medication cart. A micro-controller 158 is provided to control functions of the medication cart 10, including operation of the reversible motor 38 in forward and reverse directions, electrical power conservation, and providing status indications to the attendant 16. In particular, the micro-controller 158 is adapted to provide control signals through a power interface 160 to four switching elements 162a, 162b, 162c and 162d, in the form of MOSFET's TR1, TR2, TR3 and TR4, respectively, which are connected in an H-bridge of MOSFET pairs. Motor 38 is connected between switching elements 162a and 162c of one pair, and switching elements 162b and 162d of another pair. It will be appreciated by those skilled in the art that control of the MOSFET pairs of the H-bridge by micro-controller 158 determines the forward and reverse directions of the motor 38 as will be described in more detail below.

The switching elements 162a–162d are powered by the storage battery 140 which is electrically connected to the electronics of the medication cart 10 through electrical contact of the battery terminals 144 with the electrical spring connectors 148. A multi-position keyswitch 164 (e.g., a two pole-four throw switch) is provided on the top panel 156 of the medication cart 10 to connect battery voltage V+ to selected components of the electronics system when the keyswitch is turned to the "on" position. While not shown, it will be appreciated that a +5V voltage regulator provides a 5V "$V_{cc}$" signal to power digital components of the electronics system.

Forward and reverse direction of the motor 38 is controlled through Pulse Width Modulation (PWM) control of the MOSFET pairs 162a and 162c, and the pairs 162b and 162d, by the micro-controller 158. In particular, the micro-controller 158 adjusts the PWM duty cycle to either increase the duty cycle of the first MOSFET pair 162a and 162c, in which case the motor 38 operates in the forward direction, or conversely to increase the duty cycle of the second MOSFET pair 162b and 162d, in which case the motor 38 operates in the reverse direction. As will be described in more detail below, at a 50% PWM duty cycle, the motor 38 is stopped. Preferably, as the PWM duty cycle is adjusted between 50% to 100%, motor 38 operates in the forward direction. Conversely, as the PWM duty cycle is adjusted between 50% and 0%, motor 38 operates in the reverse direction.

Keyswitch 164 includes three (3) speed selections, shown as "F" for fast, "M" for medium, and "S" for slow, for operation of medication cart 10 in the forward direction. In the reverse direction, medication cart 10 defaults to the slow speed. Keyswitch 164 couples an appropriate signal to micro-controller 158 which indicates the selected forward speed of operation of medication cart 10. Micro-controller 158 has a look-up table of different speed/back EMF set points which each correspond to a different speed selected by keyswitch 164. That is, each selected speed ("S", "M" and "F") of medication cart 10 has a corresponding back EMF value or speed set point which is stored for that speed in micro-controller 158. For example, if micro-controller 158 receives a signal that rocker switch 154 has been moved to the forward position, the micro-controller looks up the appropriate speed set point (i.e., back EMF value) corresponding to the speed selected at keyswitch 164, and incrementally adjusts the PWM duty cycle until medication cart 10 achieves the appropriate speed set point or back EMF value. Thus, medication cart 10 is adapted to slowly ramp up to the speed selected by keyswitch 164 through incremental adjustment of the PWM duty cycle. Conversely, if micro-controller 158 receives a signal indicative that rocker switch 154 has been moved to the reverse position, the micro-controller adjusts the PWM duty cycle to the default speed set point (back EMF value) for reverse operation of medication cart 10.

To achieve the proper speed set point, the electronics system of medication cart 10 includes a back EMF sensing circuit 166 which measures the back EMF of motor 38 when all of switching elements 162a–162d are turned off. It will be appreciated that the measured back EMF voltage of motor 38 is proportional to its speed. Micro-controller 158 receives the back EMF voltage signal and incrementally adjusts the PWM duty cycle to drive the error between the set point speed and the measured speed to zero. If medication cart 10 is traveling down a steep incline and is heavily loaded, for example, the measured speed of the cart may exceed the set point speed. In this case, the micro-controller 158 initiates a "brake" signal to power interface 160 which turns on switching element pair 162c and 162d to short out motor 38 and thereby provide a braking action.

Medication cart 10 also includes an overcurrent detecting circuit 168 to detect if the cart is in a stall situation, for example. The current flowing through motor 38 is converted to a measured voltage by overcurrent detecting circuit 168 which is compared by micro-controller 158 with a maximum safe current value stored in the micro-controller. If the measured current value through motor 38 exceeds the maximum safe current value stored in micro-controller 158, the micro-controller aggressively adjusts the PWM duty cycle to reduce the current flowing through the motor. A timer in micro-controller 158 is initiated when an overcurrent condition occurs to cause the micro-controller to disable all switching elements 162a–162d coupled to motor 38 if the overcurrent condition exceeds a predetermined duration, such as one minute, for example. Micro-controller 158 is reset by releasing the rocker switch 154.

A normally closed relay brake 170 is provided to short out motor 38 when keyswitch 164 is turned "off," thereby providing a braking action to the motor when medication cart 10 is not in use. When keyswitch 164 is turned on, battery voltage V+ from the keyswitch causes relay brake 170 to open, thereby allowing control of motor 38 by micro-controller 158 as described in detail above. A timer within micro-controller 158 detects the duration of inactivity of medication cart 10, such as thirty seconds, for example, and couples an appropriate signal to relay brake 170 to close. Manual operation of rocker switch 154 in either the forward or reverse directions will re-open relay brake 170 to permit operation of medication cart 10.

A battery charger 172 is provided to be electrically coupled to storage battery 140 through battery charger coupling 152 located on the front of medication cart 10 (FIG. 2). When the battery charger 172 is connected to battery charger coupling 152, a signal is coupled to micro-controller 158 which disables all of the switching elements 162*a*–162 and closes relay brake 170 to prevent movement of medication cart 10. A signal indicative of battery voltage is coupled to micro-controller 158, and the micro-controller provides an appropriate signal to battery status LED's 174 to provide a battery status indication to the attendant 16. The battery status LED's 174 are preferably green and red LED's, with blinking control, to provide a variety of battery status indications to the attendant 16.

Thus, it will be appreciated by those skilled in the art that he driving unit of the present invention provides self-propelled motion to the medication cart when the drive wheel is extended to reduce physical strain associated with movement of the cart. Movement of the drive wheel between the extended and retracted positions by operation of the foot pedals provides a quick and easy switch of the medication cart between manual and self-propelled modes of operation. Moreover, the drive and castor wheels permit self-propelled movement of the medication cart in a variety of directions.

From the above disclosure of the general principles of the present invention and the preceding detailed description of preferred embodiments, those skilled in the art will readily comprehend the various modifications to which the present invention is susceptible. For example, while movement of the drive wheel 40 between the extended and retracted positions has been shown and described through foot operation of inner and outer pedals 70 and 72, it is contemplated that upward and downward movement of the drive wheel could also be motorized through a separate motor or similar mechanism to provide more automated operation of the medication cart 10. Additionally, while both inner and outer pedals 70 and 72 are preferred for controlling upward and downward movement of drive wheel 40, it will be appreciated that inner pedal 70 is not required and therefore could be optional. Moreover, while driving unit 22 has been described as preferably comprising forward and rearward support assemblies 24 and 26, it will be appreciated by those skilled in the art that driving unit 22 could be a one-piece, integral structure without departing from the spirit and scope of the present invention. Thus, the invention in its broader aspects is therefore not limited to the specific details and illustrative examples shown and described. Accordingly, departures may be made from such details without departing from the spirit or scope of Applicants' general inventive concept. Therefore, Applicants desire to be limited only by the scope of the following claims and equivalents Having described the invention,

We claim:

1. Apparatus for providing self-propelled motion to a medication cart, comprising:

a support assembly adapted to be mounted to a base of a medication cart;

a plurality of wheels carried by said support assembly and adapted for supporting said medication cart on a substantially planar surface;

at least one drive wheel carried by an extension and retraction device operatively connected to said support assembly and operable to be selectively manually moved between extended and retracted positions for respectively engaging with and disengaging from said substantially planar surface;

a motor operably connected to said drive wheel for rotating said drive wheel in at least a first direction; and a control switch coupled to said motor and carried by said medication cart to permit selective manual operation by an attendant for operating said drive wheel in said at least first direction for providing self-propelled motion to said medication cart.

2. The apparatus of claim 1 wherein said plurality of wheels are operable to turn about substantially vertical axes to permit manual steering of said medication cart in a plurality of directions.

3. The apparatus of claim 1 wherein said drive wheel is biased toward said extended position to engage said substantially planar surface.

4. The apparatus of claim 1 wherein said drive wheel is operable to extend beyond a plane defined by lowermost points of said plurality of wheels to accommodate for irregularities in said substantially planar surface and thereby provide substantially constant engagement of said drive wheel with said surface.

5. The apparatus of claim 1 wherein said motor is operable to rotate said drive wheel in first and second directions corresponding to forward and reverse motions of said medication cart.

6. The apparatus of claim 5 wherein said manually operated control switch selectively operates said motor in said first and second directions.

7. The apparatus of claim 1 wherein said control switch is adapted to be positioned on a top surface of said medication cart for selective manual operation by an attendant.

8. The apparatus of claim 1 further comprising a manually operated selection device operatively connected to said extension and retraction device for selectively moving said drive wheel between said extended and retracted positions.

9. The apparatus of claim 1 wherein said motor is selectively operable to rotate said drive wheel at a plurality of different rotational speeds.

10. The apparatus of claim 1 further comprising a storage battery for energizing said motor.

11. Apparatus for providing self-propelled motion to a medication cart, comprising:

a support assembly adapted to be mounted to a base of a medication cart;

a plurality of wheels carried by said support assembly and adapted for supporting said medication cart on a substantially planar surface;

at least one drive wheel carried by an extension and retraction device operatively connected to said support assembly and operable to be selectively manually moved between extended and retracted positions for respectively engaging with and disengaging from said substantially planar surface;

a manually operated selection device operatively connected to said extension and retraction device for selectively moving said drive wheel between said extended and retracted positions;

a motor operably connected to said drive wheel for rotating said drive wheel in at least a first direction; and a manually operated control switch coupled to said motor for selectively operating said drive wheel in said at least first direction for providing self-propelled motion to said medication cart.

12. The apparatus of claim 11 wherein said plurality of wheels are operable to turn about substantially vertical axes to permit manual steering of said medication cart in a plurality of directions.

13. The apparatus of claim 11 wherein said drive wheel is biased toward said extended position to engage said substantially planar surface.

14. The apparatus of claim 11 wherein said drive wheel is operable to extend beyond a plane defined by lowermost points of said plurality of wheels to accommodate for irregularities in said substantially planar surface and thereby provide substantially constant engagement of said drive wheel with said surface.

15. The apparatus of claim 11 wherein said motor is operable to rotate said drive wheel in first and second directions corresponding to forward and reverse motions of said medication cart.

16. The apparatus of claim 15 wherein said manually operated control switch selectively operates said motor in said first and second directions.

17. The apparatus of claim 11 wherein said control switch is adapted to be positioned on a top surface of said medication cart for selective manual operation by an attendant.

18. The apparatus of claim 11 wherein said motor is selectively operable to rotate said drive wheel at a plurality of different rotational speeds.

19. The apparatus of claim 11 further comprising a storage battery for energizing said motor.

* * * * *

UNITED STATES PATENT AND TRADEMARK OFFICE
CERTIFICATE OF CORRECTION

PATENT NO. : 6,098,732
DATED : August 8, 2000
INVENTOR(S) : Jerome M. Romick et al.

It is certified that error appears in the above-identified patent and that said Letters Patent is hereby corrected as shown below:

Column 1,
Line 38, change "pre-determined" to -- predetermined --.

Column 2,
Line 26, change "energize d" to -- energized --.
Line 27, change "cat rt" to -- cart --.
Line 54, change "w heel" to -- wheel --.

Column 3,
Line 17, change "bio hazard" to -- biohazard --.
Line 67, change "attache d" to -- attached --.

Column 4,
Line 32, change "non-marring" to -- nonmarring --.

Column 5,
Line 23, change "A pair of cables 116 are provided connections 118 positioned approximately midway on opposite sides of the pivot link 108."
To
-- A pair of cables 116 are provided which extend from respective pedal links 86 of the outer pedal 72 to pivot connections 118 positioned approximately midway on opposite sides of the pivot link 108 --.
Line 26, change "cable s" to -- cables --.

Column 6,
Line 21, change "ex tended" to -- extended --.
Line 31, change "t he" to -- the --.

UNITED STATES PATENT AND TRADEMARK OFFICE
CERTIFICATE OF CORRECTION

PATENT NO. : 6,098,732
DATED : August 8, 2000
INVENTOR(S) : Jerome M. Romick et al.

It is certified that error appears in the above-identified patent and that said Letters Patent is hereby corrected as shown below:

Column 9,
Line 11, change "162a– 162" to -- 162a-162d --.
Line 20, change "that he driving unit" to -- that the driving unit --.
Line 55, change "equivalents" to -- "equivalents." --

Signed and Sealed this

Eighteenth Day of September, 2001

Attest:

NICHOLAS P. GODICI
Attesting Officer
Acting Director of the United States Patent and Trademark Office